United States Patent
Tourani et al.

(10) Patent No.: US 10,601,443 B1
(45) Date of Patent: Mar. 24, 2020

(54) PROTOCOL FOR LIGHTWEIGHT AND PROVABLE SECURE COMMUNICATION FOR CONSTRAINED DEVICES

(71) Applicant: Arrowhead Center, Inc., Las Cruces, NM (US)

(72) Inventors: Reza Tourani, Las Cruces, NM (US); Satyajayant Misra, Las Cruces, NM (US); Scott Ortegel, Las Cruces, NM (US); Travis Mick, Albuquerque, NM (US); Vicente Ibarra, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 237 days.

(21) Appl. No.: 15/685,892

(22) Filed: Aug. 24, 2017

Related U.S. Application Data

(60) Provisional application No. 62/378,787, filed on Aug. 24, 2016.

(51) Int. Cl.
   *H04L 29/06* (2006.01)
   *H03M 7/42* (2006.01)
   (Continued)

(52) U.S. Cl.
   CPC ............ *H03M 7/42* (2013.01); *H04L 9/0825* (2013.01); *H04L 9/14* (2013.01); *H04L 9/002* (2013.01); *H04L 9/30* (2013.01)

(58) Field of Classification Search
   CPC combination set(s) only.
   See application file for complete search history.

(56) References Cited

U.S. PATENT DOCUMENTS

| 6,963,972 B1 | 11/2005 | Chang et al. |
| 7,508,935 B2 | 3/2009 | Oommen et al. |

(Continued)

FOREIGN PATENT DOCUMENTS

| EP | 2040453 | 3/2009 |
| JP | 2007208931 | 8/2007 |

(Continued)

OTHER PUBLICATIONS

"Pursuit Project", http://www.fp7-pursuit.eu, Downloaded Sep. 24, 2019, 2017.

(Continued)

*Primary Examiner* — Malcolm Cribbs
(74) *Attorney, Agent, or Firm* — Peacock Law P.C.; Justin R. Jackson; Deborah A. Peacock

(57) ABSTRACT

A method of sending content comprising receiving a membership request from a client at an anonymizer, the membership request being encrypted with a public key of the anonymizer, generating a table from a prefix-free source coding scheme with a full binary tree, a pseudonym range, and a master key, sending the table, the pseudonym range, and the master key, all encrypted with a public key of the client, receiving a content request with an encoded content name, the content request being encoded using the table, a pseudonym from the pseudonym range, and the master key, decoding the content name of the content request using the pseudonym, the table, and the master key, retrieving content corresponding to the content name, and sending the content and the encoded content name. Secure information sharing is also provided for.

12 Claims, 10 Drawing Sheets

(51) Int. Cl.
*H04L 9/14* (2006.01)
*H04L 9/08* (2006.01)
*H04L 9/30* (2006.01)
*H04L 9/00* (2006.01)

(56) References Cited

U.S. PATENT DOCUMENTS

| | | | |
|---|---|---|---|
| 7,822,204 B2 | 10/2010 | Yoshida et al. | |
| 8,023,695 B2 | 9/2011 | Rhoads | |
| 8,204,224 B2 | 6/2012 | Xiao et al. | |
| 8,855,301 B2 | 10/2014 | McGrew | |
| 9,432,342 B1* | 8/2016 | Kothari | H04L 63/061 |
| 2001/0012365 A1* | 8/2001 | Gaedke | H03M 7/42 |
| | | | 380/239 |
| 2002/0130796 A1* | 9/2002 | Tsuchido | H03M 7/40 |
| | | | 341/65 |
| 2004/0137921 A1* | 7/2004 | Valloppillil | H04W 4/12 |
| | | | 455/466 |
| 2005/0102513 A1* | 5/2005 | Alve | H04L 63/0442 |
| | | | 713/168 |
| 2006/0059265 A1 | 3/2006 | Keronen | |
| 2010/0310065 A1* | 12/2010 | Chang | H04N 7/1675 |
| | | | 380/28 |
| 2012/0173664 A1* | 7/2012 | Kammerer | H04L 63/0414 |
| | | | 709/217 |
| 2013/0135123 A1* | 5/2013 | Golander | H03M 7/6076 |
| | | | 341/65 |
| 2015/0067055 A1* | 3/2015 | Khera | H04L 67/22 |
| | | | 709/204 |
| 2016/0366403 A1* | 12/2016 | Wang | H04N 19/11 |
| 2017/0063392 A1* | 3/2017 | Kalevo | H03M 7/40 |
| 2017/0078094 A1 | 3/2017 | Olson | |
| 2017/0171564 A1* | 6/2017 | Swaminathan | H04N 19/91 |

FOREIGN PATENT DOCUMENTS

| | | |
|---|---|---|
| JP | 2008028806 | 2/2008 |
| JP | 4912772 | 4/2012 |

OTHER PUBLICATIONS

"Tor Project", http://www.torproject.org, Downloaded Sep. 24, 2019, 2017.
ACS, G. , et al., "Cache privacy in named-data networking", International Conference on Distributed Computer Systems (ICDCS), IEEE, 2013, 41-51.
Arianfar, S. , et al., "On preserving privacy in content-oriented networks", Proceedings of the ACM SIGCOMM workshop on Information-centric networking, ACM, 2011, 19-24.
Chaabane, A. , et al., "Privacy in content-oriented networking: Threats and countermeasures", ACM SIGCOMM computer Communication Review, vol. 43, No. 3, 2013, 25-33.
Connolly, Christopher , et al., "TRIST: Circumventing Censorship with Transcoding-Resistant Image Steganography", FOCI, 2014, 1-8.
Dannewitz, C. , et al., "NetInf: An information-centric design for the future Internet", GI/ITG KuVS Workshop on The Future Internet, 2009.
Dibenedetto, S. , et al., "Andana: Anonymous named data networking application", Arxiv preprint arXiv:1112.2205, 2011.
Dorrie, H. , 100 Great problems of elementary mathematics, Dover Publications, 1965, 23-25.
Fraenkel, A. S., et al., "Complexity aspects of guessing prefix codes", Algorithmica, vol. 12, Nos. 4-5, 1994, 409-419 (only 409-410 available).
Gillman, D. , et al., "On breaking a huffman code", IEEE Transactions on Information Theory, vol. 2, No. 3, 1996, 972-976.
Huffman, D. , et al., "A method for the construction of minimum redundancy codes", proc. IRE, vol. 40, No. 9, 1952, 1098-1101.
Jacobson, V. , et al., "Networking named content", Proceedings of the 5th international conference on Emerging networking experiments and technologies, ACM, 2009, 1-12.
Koponen, T. , et al., "A data-oriented (and beyond) network architecture", ACM SIGCOMM Computer communication Review, vol. 37, ACM, 2007, 181-192.
Kurihara, Jun , "A Consumer-Driven Access Control Approach to Censorship Circumvention in Content-Centric Networking", Proceedings of the 2016 Conference on 3rd ACM Conference on Information-Centric Networking, Sep. 26, 2016, 186-194.
Massey, J. L., "Guessing and entropy", Proceedings to IEEE International Symposium on Information Theory, IEEE, 1994, 204.
Muscariell, Luca , et al., "Cicn", https://wiki.fd.io/view/Cicn, Downloaded Sep. 24, 2019, 2017.
Patra, Nilkesh , et al., "Data Reduction by Huffman Coding and Encryption by Insertion of Shuffled Cyclic Redundancy Code", Dissertation, Department of Electronics & Communication Engineering; National Institute of Technology, 2007, 1-42.
Ruan, Xiaoyu , et al., "Using an Innovative Coding Algorithm for Data Encryption", IEEE Transactions, NA, 2006, 1-28.
Rueda, Luis , et al., "A fast and efficient nearly-optimal adaptive Fano coding scheme", Information Sciences, vol. 176, No. 12, 2006, 1656-1683.
Rueda, Luis , et al., "An Efficient Compression Scheme for Data Communication Which Uses a New Family of Self-Organizing Binary Search Trees", International Journal of Communication Systems, vol. 21, No. 10, 2008, 1091-1120.
Shannon, C. , "Prediction and entropy of printed english", Bell System technical journal, vol. 30, No. 1, 1951, 50-64.
Smith, G. , "On the foundations of quantitative information flow", Foundation of Software Science and Computational Structures, Springer, 2009, 288-302.
Tateson, Jane , et al., "PSIRP Project, Delverable D4.6: Final Evaluation Report on Deployment Incentives and Business Models", http:/www.psirp.org/publications/, Downloaded Sep. 28, 2017, 2010.
Vitter, Jeffrey Scott, "Design and Analysis of Dynamic Huffman Codes", Journal of the Association for Computing Machinery; vol. 34. No. 4, Oct. 1987, 825-845.
Wachs, Matthias , et al., "On the Feasibility of a Censorship Resistant Decentralized Name System", Foundations and Practice of Security; Cham, 2014, 19-30.
Wu, C.-P. , et al., "Design of integrated multimedia compression and encryption systems", IEEE Transactions on Multimedia, vol. 7, No. 5, 2005, 828-839.
Xie, D. , et al., "Enhanced multiple huffman table (mht) encryption scheme using key hopping", Proceedings of the 2004 International Symposium on Circuits and Systems (ISCAS), vol. 5, IEEE, 2004, 568-571.
Zhou, J. , et al., "Security analysis of multimedia encryption schemes based on multiple huffman table", Signal Processing Letter, vol. 14, No. 3, IEEE, 2007, 201-204.

* cited by examiner

PROTOCOL FOR LIGHTWEIGHT AND PROVABLE SECURE COMMUNICATION FOR CONSTRAINED DEVICES

CROSS-REFERENCE TO RELATED APPLICATIONS

This application claims priority to and the benefit of the filing of U.S. Provisional Patent Application No. 62/378,787, filed on Aug. 24, 2016, and the specification thereof is incorporated herein by reference.

STATEMENT REGARDING FEDERALLY SPONSORED RESEARCH OR DEVELOPMENT

This invention was made with government support under Research Grant Nos. 1241809 and 1345232 awarded by the National Science Foundation. The government has certain rights in the invention.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

The present invention relates to a lightweight communication protocol that helps the parties to achieve message confidentiality.

Description of Related Art Including Information Disclosed Under 37 C.F.R. §§ 1.97 and 1.98

Internet traffic is increasingly becoming multimedia-centric. Its growth is driven by the fast-growing mobile user base that is more interested in the content rather than its origin. These trends have motivated proposals for a new Internet networking paradigm—information-centric networking (ICN). This paradigm requires unique names for packets to leverage pervasive in-network caching, name-based routing, and named-data provenance. However, named-data routing makes user censorship easy. Hence an anti-censorship mechanism is imperative to help users mask their named queries to prevent censorship and identification. However, this masking mechanism should not adversely affect request rates.

The present invention is of a lightweight secure communication protocol that helps the communication parties to achieve message confidentiality. It preferably targets constraint devices, with minimal computation power, memory, and energy, such as sensor nodes, that are unable to perform costly cryptographic operations, for efficient encoding/decoding of their communications.

A difference between this protocol and the existing cryptographic schemes such as symmetric key cryptography is at least twofold. First, it has much lower computation overhead on the encoding/decoding devices. Second, this protocol provides a higher level of security in face of a brute force attack. These two advantages are of importance when considering ever-increasing applications of these constraint devices including habitat monitoring applications, environmental observation and forecasting systems, smart energy systems, battle field wireless sensor network, and home monitoring systems.

This invention is a perfect fit for today's embedded devices and applications, in which security and privacy plays the most important role. For instance, the constraint sensors that are nowadays used in home monitoring systems are not capable of performing heavy cryptographic operations due to their computational complexity. This invention reduces the required computational resources on a device, which makes it suitable for securing the home monitoring communication. This invention can also find application in cyber-physical systems (CPS), such as water quality monitors, smart grid devices, science experiment devices.

BRIEF SUMMARY OF THE INVENTION

The present invention is of such an anti-censorship framework, which is lightweight and specifically targets low compute power mobile devices. Experimental results prove the framework's effectiveness: for requests, adding between 1.3-1.8 times in latency overhead over baseline ICN; significantly less than the overhead of the state of the art Tor (up to 38 times over TCP).

The invention uses Huffman coding employed in a unique manner to guarantee confidentiality for secure communications. The protocol is preferably optimized for constraint devices, such as Internet of Things (IoT) devices.

An important advantage of the invention is the low computation and communication complexity built into the design of the protocol, which is very useful for constrained and mobile devices for secure communication. Another advantage of the approach is the provable higher level security, both from an information-theoretic standpoint and a computational security standpoint. The invention achieves better resistance to brute-force attack than the state-of-the-art mechanism.

The present invention can be useful in several commercial IoT and cyberphysical systems settings. One of the biggest concerns in IoT communication is how to enable secure and secret communication between the IoT/CPS device and the cloud/server. The communication mechanism has to be compute, memory, and latency efficient, while still being secure against different attacks. The IoT industry has several areas of application, such as home monitoring and control, agriculture, body sensors, and industrial sensors. Recently, there is a big thrust towards making science networks (with their many remote sensors) secure, our algorithm can find application there. The invention is further described in the documents attached.

In particular, the invention is of a method of (and concomitant apparatus and non-transitory, computer readable medium comprising code for) sending content, comprising: receiving a membership request from a client at an anonymizer, the membership request being encrypted with a public key of the anonymizer; generating at the anonymizer a table from a prefix-free source coding scheme with a full binary tree, a pseudonym range, and a master key; sending to the client from the anonymizer the table, the pseudonym range, and the master key, all encrypted with a public key of the client; receiving a content request with an encoded content name from the client at the anonymizer, the content request being encoded using the table, a pseudonym from the pseudonym range, and the master key; decoding the content name of the content request using the pseudonym, the table, and the master key; retrieving content corresponding to the content name; and sending to the client from the anonymizer the content and the encoded content name. In the preferred embodiment, the table is a Huffman table. The pseudonym is selected from the pseudonym range and hashed with the master key to generate a hashed value. The encoded content name includes a domain name of the anonymizer, the content name encoded with the table, most preferably the content name encoded with the table and XOR'd with the hashed value. The table preferably is randomly generated.

The invention is further of a method of (and concomitant apparatus and non-transitory, computer readable medium comprising code for) securely sharing information, comprising: generating at a server a table from a prefix-free source coding scheme with a full binary tree; forwarding the table to a client using pubic key encryption; receiving a content request from the client encoded with public key encryption and the table; and sending to the client content corresponding to the content request and encode with public key encryption and the table. In the preferred embodiment, the table is randomly generated and is a Huffman table.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1A:
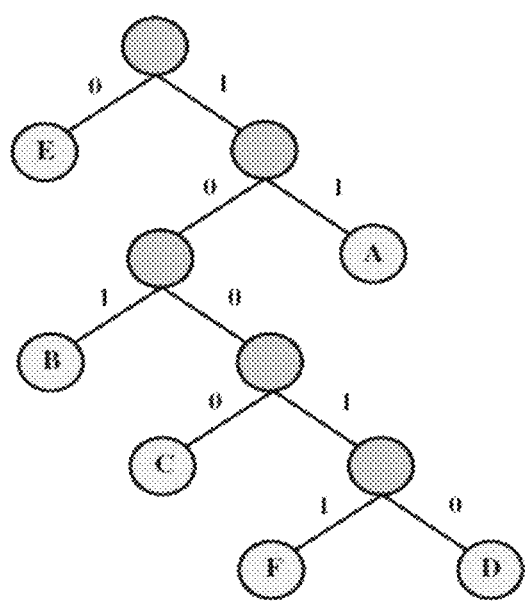
FIGS. 1A and 1B illustrate preferred key conventions employed in the present invention.

Consider a network composed of a set of users (U), routers (R), providers (P), and a set of trusted proxies named anonymizers. A router is either a filtering router or a normal router. A filtering router ($r_f$) filters the incoming requests' data names and drops requests whose names appear in a blacklist of contents. The filtering process is online (happens on the fly), and to reduce congestion and prevent throttling of the traffic the filtering is generally performed very close to line speed (packet arrival rate). Without loss of generality, assume that a user is directly connected to a filtering router, which is in turn connected to the rest of the network.

Assuming that the Internet Protocol (IP) is not used as the network layer, in ICN, the first hop node on the path of a request is the only one that can identify the requester (from MAC-layer header); further along the requester's identity is absent in the packet. This is the worst case scenario. If IP-based addressing is used, assume that the requester's IP address is cloaked using some anonymization technique. With IP-cloaking the situation is the same as when IP addressing is not used. The present invention also applies when the filtering router and the user are separated by several hops. The user requests a content by sending an "interest packet" containing the name of the content chunk. The name of an object is in a hierarchical format starting with the content provider's name, e.g., www.youtube.com/ArabSpring.mpg.1 (the postfix number '1' is the chunk ID).

In the present invention, instead of using the plaintext content name for the interest, the invention uses an encoded name. The encoded name can only be decoded correctly by a pre-selected anonymizer which has the decoding table. No entity in the path between the anonymizer and the requester has the decoding table and hence cannot decode the name. Between the anonymizer and the data provider (source or an intermediate router) the request is transmitted as a normal request and no filtering happens. Assume that between the anonymizer and the requester the data is encrypted; otherwise the filtering entity can identify the content. Generally, a third-party entity, chosen by the user from a publicly available list, serves as the anonymizer. This is analogous to what happens today: users evade traffic censorship by choosing an anonymizing service, such as anonymizer.com, as a proxy, and bypass the censors by tunneling their traffic (e.g., Facebook, Youtube) through the anonymizer's servers. A content provider can also operate as the anonymizer.

Note that the present invention has a trade-off between user privacy and caching (network) efficiency. It has been shown that to guarantee strong unlinkability of users' identity with their requests in-network caching should be avoided. In the present framework, if a user does not trust the network, it can request the content provider to be its anonymizer. This would guarantee strong unlinkability in the network, however, the corresponding cached data at intermediate routers is unusable to serve new requests. This is true with Tor and ANDaNA. The multi-layered onion-routing based encryptions render the cached private data unusable for satisfying repeat requests. On the other hand, if the user chooses an anonymizer in the network, the cached data is only unusable by the routers in the path between the user and the anonymizer. In-network caching can be leveraged in the rest of the path. For the present analysis, assume the content provider is the same as the anonymizer.

For the present analysis, assume that the attacker (censoring authority) is either an active or a passive eavesdropper. The attacker's aim is to learn how to correctly decode an interest. Also assume that the attacker has bounded capabilities, i.e., it cannot do large-scale brute force attacks. A passive eavesdropper can capture all packet transmissions to perform analysis. An active eavesdropper can capture and modify in-flight requests and also masquerade as a legitimate user to send interests.

Consider an alphabet of size N for the source messages (chunk names). The source message is denoted by $M^k$, where k is the message size. The encoded message is denoted by Z and is assumed to be a binary string of size n. In the present framework three sources of randomness exist, namely the random selections of the Huffman tree structure, the conventional key, and the source alphabet order from their respective universal sets. The user and the content provider can secretly perform one or more of these three random selections, thus making it difficult to break the system. The Huffman tree is a full binary tree with source alphabet symbols placed at the leaf nodes. Hence, for an alphabet of size N there are N leaf and N−1 internal nodes. However, for the same set of symbols there can be several possible trees, one of which can be chosen randomly. The preferred convention to generate a key for a Huffman tree in detail below. The last source of randomness is the random choice of the alphabet order, that is, the order in which the alphabet symbols are placed on the leaf nodes. Instead of the standard Huffman coding where the placement of the symbols is based on the frequency of a symbol, the symbol placement can also follow a random distribution to further increase the framework's randomness.

Exploiting the Huffman source coding, the present invention preferably employs a novel key generation mechanism from the Huffman tree. Assume that the source (user) and the destination (content provider) of a communication have secretly shared a Probability Mass Function (pmf), which represents the probability of the occurrence of the symbols of an alphabet set in a message. The pmf is selected deliberately as a part of the secrecy mechanism and does not reflect the true source distribution. Also assume that both the source and the destination have information to build the Huffman tree with the same structure. The Huffman tree is generated by assigning labels '0' and '1' to the left and the right branch respectively, at each depth of the tree.

Figure 1B:
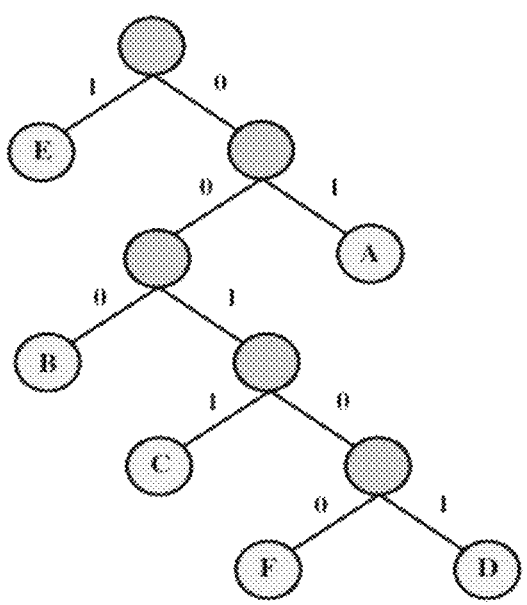

With a little analysis one can see that for a Huffman tree with N−1 internal nodes there are $2^{(N-1)}$ mutation trees, where a mutation tree of a Huffman tree is generated by swapping the labels of the internal nodes. Each of these mutation trees is associated with a unique string of size $2^{(N-1)}$ that is obtained by traversing the tree sequentially by levels and at each level picking up the labels from left to right—similar to breadth-first search. Assuming that one has an arbitrary pmf for a six symbols alphabet, FIG. 1 illustrates the corresponding Huffman tree. According to the present convention, the key for the tree (a) on the left hand side is "0101100110" while the tree (b) on the right hand side, has the key "1001011001" despite having the same structure. The source and the destination can frequently switch to a new key from the pool of $2^{(N-1)}$ keys, corresponding to the $2^{(N-1)}$ mutation trees, to improve communication secrecy.

Note that this present convention is not restricted to the Huffman source coding. In general, every prefix-free source coding scheme with a full binary tree can use it.

Huffman coding is a useful approach to mitigate censorship in ICNs. In the present framework, one encodes a part of the content name, the postfix after the domain name, using the Huffman coding algorithm. The domain name is not encoded to allow for name based routing. Note that if the anonymizer is not the provider then the domain name can also be encoded. In this case, the anonymizer's domain name will be used as the prefix of the interest and used for routing. Once the interest reaches the ingress router of the domain (a CP or an anonymizer), the name in the interest is decoded into the real name. Although it is preferred to use the Huffman coding technique to encode user interests, other coding techniques can also be used in the present framework. The present framework preferably comprises three phases: initialization, secure content sharing, and secure content response. The initialization phase is used for sharing credentials between the user and an anonymizer to enable censorship-proof communication. For simplicity of exposition, assume that the content provider is the anonymizer. Table 1 presents the notation used in the preferred protocols.

TABLE 1

Notations Used

| Notation | Description |
| --- | --- |
| $PK_C$ | Client's public key |
| $PR_C$ | Client's private key |
| $CR_C$ | Client's certificate |
| $PK_A$ | Anonymizer's public key |
| $PR_A$ | Anonymizer's private key |
| $CR_A$ | Anonymizer's certificate |
| $[p_i^l, p_i^h]$ | Pseudonym range for client i |
| $M_i$ | Master key shared between anonymizer and client i |
| HT | A Huffman table shared between client and anonymizer |
| $(\ldots)_{HT}$ | Symmetric key operation using Huffman table HT (content encoding) |
| $\{\ldots\}_{PK}$ | Encryption with public key PK |
| $\{\ldots\}_{PR}$ | Decryption with private key PR |
| $[\ldots]_{PR}$ | Signing with private key PR |
| $[\ldots]_{PK}$ | Signature verification with public key PK |

Figure 2:
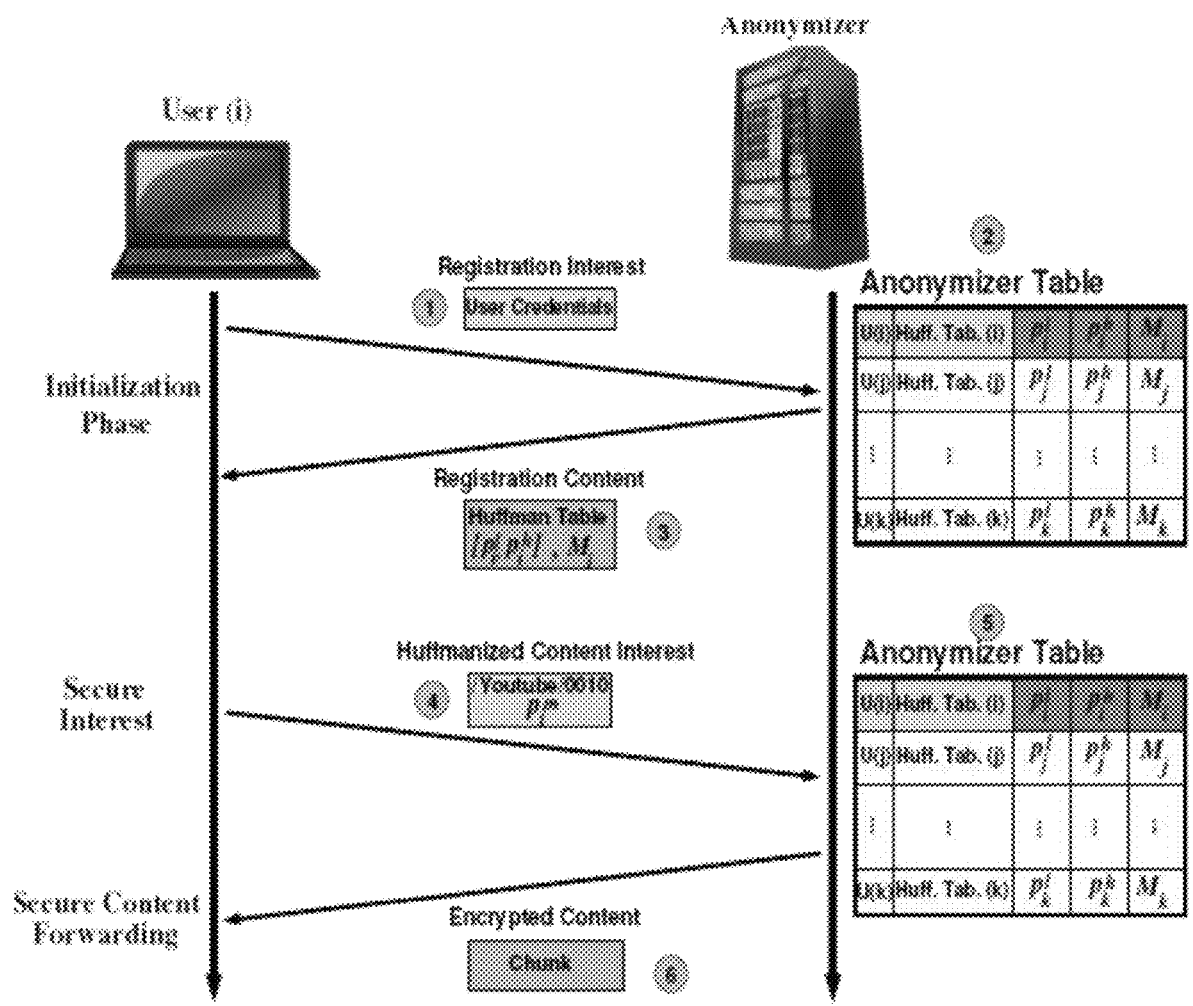
FIG. 2 is a schematic diagram of the method and apparatus of the invention.

In the initialization phase, the client sends a membership request to the anonymizer (A) encrypted using the anonymizer's public key and signed using the user's private key (Protocol 1:Line 1). On receiving the membership request, A generates a random Huffman table, by using a random pmf for the interest, and sends the membership reply secretly to the requester; it also stores these information in its table (see FIG. 2). There are two mechanisms that need to be addressed here: a) How will the membership reply be sent secretly to user $u_i$? and b) How can A store each $u_i$'s credentials to allow quick indexing into the table to identify the corresponding Huffman table? The anonymizer A generates a range of pseudonyms ($[p_i^l-p_i^h]$) for $u_i$ and creates a table entry consisting of the generated Huffman table, the pseudonyms' lower ($p_i^l$) and upper ($p_i^h$) limits, a master key, and the PKI details of $u_i$. It then encrypts the Huffman table, the pseudonym limits, and the master key using the public key of $u_i$ (or a shared symmetric key) and signs the message using its private key before sending the reply to $u_i$ (Protocol 1: Lines 2-3). At this point, the initialization phase is complete and both $u_i$ and A have the required information for censorship-proof communication. Steps 1 to 3 in FIG. 2 illustrate this phase. After the initialization phase, the client can request privacy-sensitive content.

---
Protocol 1 Initialization Phase
---

Input: Client's credentials, client's public/private key, anonymizer's public/private key.
Output: Huffman table, pseudonym range, master key.

1: Client securely sends registration request to Anonymizer:

$$\text{Request} = \{[C\mathcal{R}_c]_{PR_C}\}_{PK_A}$$

2: Anonymizer authenticates the client and generates a reply including a Huffman table, pseudonym range, and a master key:
Reply = <Huffman-Table, $[p_i^l, p_i^h]$, $M_i$>

3: Anonymizer securely sends the reply to the client:

$$\{[\text{Reply}]_{PR_A}\}_{PK_C}$$

---

For the secure content request phase, the client needs to generate an interest packet, where the interest name has to be customized to evade censorship. Essentially, the hierarchical content name is composed of the anonymizer's domain name in plaintext (to enable prefix based routing), concatenated with the Huffman encoded postfix of the name representing the exact chunk. The Huffman encoded portion of the name may vary depending on the secrecy level required by the user. For the highest level of secrecy, the complete name postfix after the anonymizer's domain name needs to be encoded. For lower levels of secrecy, the user can encode a portion of the postfix. For instance, consider a content name for an Arab Spring video: www.google.com/movies/2012/ArabSpring/HD/TahrirSquare. The interest with highest secrecy level encodes all segments except www.google.com/(anonymizer's domain name); while the lowest level secrecy, only encodes the last segment, Tahrir-Square, the prefix is plaintext. This flexibility helps the user to adjust its desired level of secrecy.

For fast indexing at A, $u_i$ chooses a random pseudonym $p_i^m \in \{p_i^l - p_i^h\}$ and adds it as an identity field in the interest packet/chunk. Anonymizer A uses an ordered binary tree data structure, which has the ordered pseudonym ranges of the users as leaves, to search for ui's ID (u(i)) in its table. Then, given $p_i$, to identify $u_i$ A makes O(log IUD comparisons, where U is the set of users. The client hashes the selected pseudonym with the master key it received from the anonymizer (Protocol 2: Line 1). After that, the client xor's the hashed value and the Huffman encoded content name to achieve higher security (Protocol 2: Line 2) and adds the anonymizer domain name as the encoded name prefix for routing sake (Protocol 2: Line 3). Clients not interested in privacy requirements can be allocated only one identifier or can use only one pseudonym from their range. After the interest packet generation, the client sends the interest for the content chunk (Protocol 2: Line 4). Step 4 of FIG. 2 illustrates this.

---
Protocol 2 Secure Content Request
---

| | |
|---|---|
| Input: | Contents-name, Huffman table, pseudonym, master key. |
| Output: | Encoded request. |
| 1: | Client randomly selects a pseudonym from the assigned pseudonym range and hashes it with the master key: Value = Hash(M, $p_i^m \in [p_i^l, p_i^h]$) |

---
Protocol 2 Secure Content Request
-continued
---

| | |
|---|---|
| 2: | It calculates the XOR of the hashed value and the encoded name (using Huffman table): NAME = Encode(content-name) $\oplus$ Value |
| 3: | Client adds the anonymizer domain name to the NAME as its prefix: Encoded-Name =/Anonymizer/NAME |
| 4: | Client sends the request with Encoded-Name and the selected pseudonym to the anonymizer: ⟨Encoded-Name, $p_i^m$⟩ |

---

For the secure content response phase, when the interest packet arrives at a filtering node, the filtering node can only infer partial information from the received interest packet. The inference is only based on A's domain name, but is insufficient for filtering the interest to identify the content. The filtering router can only perform longest prefix matching of the interest name with entries in its forwarding information base (FIB) and forward the interest to the appropriate next hop. At A, a table look-up on the pseudonym (Step 5 of FIG. 2) in the interest packet returns the desired Huffman tree and master key (Protocol 3: Line 1). A calculates the hash of pseudonym using the master key and xor's this value with the content name from the received request (Protocol 3: Line 2). Then A decodes the postfix and obtains the data from the content store(s) (Protocol 3: Line 3). After retrieving the requested content (Protocol 3: Line 4), A uses the same interest name and the same pseudonym while encrypting the content (symmetric/public key) (Protocol 3: Line 5).

The present framework is also amenable to the other proposed FIA named-data architectures. Note that naming of data in all these architectures fall into one of two categories: hierarchical, human readable naming and flat machine-readable naming (hashed names). In both cases, the name in the interest can be treated as a source message and encoded using the shared Huffman table. For instance, in NetInf, the Anonymizer A can operate as a local or global name resolution server (outside the filtering region) and do the transformation between the encoded and the real-name of the private data. In DONA, the anonymizer can operate as a high-level resource handler beyond the filtering routers. In PSIRP, a subset of the nodes in the rendezvous system can be chosen as the anonymizer(s). These nodes do the mapping between the encoded name and the real name of the data. The anonymizer can send the forwarding identifier to the source (provider) to send the data to the requester and ask the provider to use the encoded name.

---
Protocol 3 Secure Content Response
---

| | |
|---|---|
| Input: | Encoded-Name, Huffman table, pseudonym, master key. |
| Output: | Successful content retrieval by the anonymizer. |
| 1: | Anonymizer retrieves the pseudonym from the request and looks up the client's information. |
| 2: | Anonymizer hashes the pseudonym with the master key and XORs it with the Encoded-Name from the request: Huff-Name = Encoded-Name $\oplus$ Hash(M, $p_i^m$) |
| 3: | Anonymizer decodes the Huff-Name using the Huffman table: Original-Name = Decode(Huff-Name) |
| 4: | It retrieves the content using Original-Name. |

| Protocol 3 Secure Content Response |
| --- |
| 5: Anonymizer forwards the reply including the Encoded-Name and content to the client:<br>⟨Encoded-Name, Content⟩ |

In this section, the application investigates the information-theoretic security of the framework of the invention and the protocols under different assumptions on the eavesdropper's knowledge of the system. As mentioned above, the invention uses the structure of the Huffman tree, the key, and the alphabet order as the sources of randomness. The invention preferably omits the conventional key in the Huffman tree and only considers the tree structure and the alphabet order as the combination of these two sources covers all possible coding tables. Hence, an attacker with the knowledge of the tree structure and the alphabet order can reconstruct the coding table, which breaks the system. However, as these are encrypted using PKI or symmetric keys before transmission, they are secure.

Thus, there are three remaining information-theoretic attack scenarios, which the present application will study below: (i) the eavesdropper has no parsing information, that is, tree structure and the alphabet order are unknown; (ii) the eavesdropper has the order of the alphabet only; and (iii) the eavesdropper has tree structure information only. Note that the source message is essentially the hierarchical data name postfix that needs to be encoded.

First, one derives basic entropy terms that one will need in the rest of the section. As mentioned before, given a tree T for alphabet size N, one has $2^{(N-1)}$ mutually independent mutation trees for T, that is, $2^{(N-1)}$ keys for T. The selection of a mutation tree (i.e., key S's selection) uniformly at random from the set of mutation trees results in S's entropy to become:

$$H(S) = -\sum_{i=1}^{2^{N-1}} p(i) \log(p(i)) \quad (1)$$

$$= -\frac{1}{2^{N-1}} \sum_{i=1}^{2^{N-1}} \log(p(i)) \quad (2)$$

$$= \log(2^{N-1}) \quad (3)$$

$$= N - 1. \quad (4)$$

Besides the selection of a mutation tree of T, the random choice of the tree structure (a uniform random distribution) is also another source of randomness. The number of mutually independent full binary trees with N leaves is given by the (N−1)th Catalan number ($C_{N-1}$). The Nth Catalan number ($C_N$) with increasing N is given by $C_N \approx \Omega(4^N/N^{3/2})$, thus $C_{N-1} \approx C_N$ for large N. Consequently, the entropy of using a random and secret tree structure ($T_R$) can be written as:

$$H(T_R) = -\sum_{j=1}^{\left(\frac{4^N}{N^{3/2}}\right)} p(j) \log(p(j)) \quad (5)$$

$$= -\frac{1}{\frac{4^N}{N^{3/2}}} \sum_{j=1}^{\left(\frac{4^N}{N^{3/2}}\right)} \log(p(j)) \quad (6)$$

$$\geq \log\left(\frac{4^N}{N^{3/2}}\right) \quad (7)$$

$$= \log 2^{2N} - \log N^{3/2} \quad (8)$$

$$= 2N - 3/2 \log N. \quad (9)$$

Given an alphabet of size N, there exist N! permutations of the alphabet order for a tree. The selection of an alphabet ordering uniformly at random from the set of all possible permutations results in A's (i.e., alphabet ordering A's selection) entropy to become:

$$H(A) = -\sum_{l=1}^{N!} p(l) \log(p(l)) \quad (10)$$

$$= -\frac{1}{N!} \sum_{l=1}^{N!} \log(p(l)) \quad (11)$$

$$= \log(N!) \quad (12)$$

$$= N \log N \quad (13)$$

Equation (13) is derived according to log(N!) asymptotic bound, $\log(N!) \in \theta(N \log N)$.

Also, considering the source alphabet with N symbols (e.g., N=512 for Unicode or 256 for ASCII), which are uniformly randomly distributed, the source symbol entropy is given in Equation (16):

$$H(X) = -\sum_{k=1}^{N} p(x_k) \log(p(x_k)) \quad (14)$$

$$= -\frac{1}{N} \sum_{k=1}^{N} \log(p(x_k)) \quad (15)$$

$$= \log N. \quad (16)$$

Next, different eavesdropper attack scenarios are discussed.

Scenario 1: Both Tree Structure and the Alphabet Order are Unknown.

In this scenario, the eavesdropper has no knowledge of the tree structure or the alphabet order. Let $M^k$ be the sequence of k symbols to be encoded and Z be the encoded binary sequence with length n symbols. The evaluation of the mutual information between the source message and the encoded sequence is provided by Equation (19) along with (9), (13), (16):

$$I(M^k; Z) = H(M^k) - H(M^k|Z) \quad (17)$$

$$\leq \max(kH(X) - (H(T_R) + H(A)), 0) \quad (18)$$

$$= k \log(N) - 2N + (3/2 - N) \log(N). \quad (19)$$

Equation (17) is obtained from the definition of the mutual information between the source message and its corresponding encoded sequence. The r.h.s. of Equation (18) is obtained from the fact that in this scenario the entropy of the message, given its encoded sequence, equals the entropies of the alphabet order and tree structure choices, and that the mutual information is always non-negative. The outcome of Equation (19) is the conditional entropy of the source sequence, given the encoded sequence, which is equal to the total randomness for both the structure and the alphabet order.

Scenario 2: Tree Structure Known, but not the Alphabet Order.

In this scenario, the eavesdropper has complete knowledge of the tree structure and consequently can build the Huffman tree, and the alphabet order is the only secret. Hence, the mutual information between the source message and its encoded binary string is:

$$I(M^k; Z) = H(M^k) - H(M^k | Z) \tag{20}$$

$$\leq \max(kH(X) - H(A), 0) \tag{21}$$

$$= \max(k\log N - (N\log(N)), 0) \tag{22}$$

$$= k\log N - N\log(N). \tag{23}$$

Equation (23) presents the entropy of the source message assuming each symbol of this message is an i.i.d. random variable. In practice, the dependency between the letters in a word in the English alphabet reduces the entropy of the upcoming symbol (letter) given the prior symbols. This will be discussed below. Equating the r.h.s. of Equation (23) to zero, one concludes that the amount of information leakage as k becomes greater than N is proportional to the value of k. Although the leakage increases linearly with k, it must be investigated whether the eavesdropper can leverage this leakage or not. This is next investigated.

Scenario 3: Alphabet Order Known, but not the Tree Structure.

The opposite scenario is next investigated: the eavesdropper knows the alphabet order, but does not have access to the tree structure. This can happen when the eavesdropper intercepts the alphabet order sharing communication phase between the anonymizer and the user and somehow identifies the encrypted key. Equation (27) returns the entropy of the source message under this condition:

$$I(M^k; Z) = H(M^k) - H(M^k | Z) \tag{24}$$

$$\leq \max(kH(X) - H(T_R), 0) \tag{25}$$

$$= \max(k\log N - (2N - 3/2\log N), 0) \tag{26}$$

$$= (k + 3/2)\log N - 2N. \tag{27}$$

Table 2 illustrates the thresholds of source message lengths (in symbols) for perfect secrecy for the three scenarios, evaluated in Equations (19), (23), (27) respectively (i.i.d. symbols in the messages). Note that messages longer than the threshold lead to leakage; leakage is defined as the difference between the message length and the length of the threshold.

TABLE 2

Maximum possible source message length k (in symbols) for perfect secrecy in i.i.d. messages.

| Scenario | N = 32 | N = 64 | N = 128 | N = 256 | N = 512 |
| --- | --- | --- | --- | --- | --- |
| Scenario 1 | 43.3 | 83.8 | 163.07 | 318.5 | 624.2 |
| Scenario 2 | 32 | 64 | 128 | 256 | 512 |
| Scenario 3 | 11.3 | 19.8 | 35.07 | 62.5 | 112.2 |

Dependent Source Scenario's Information Leakage.

So far, it has been assumed that the source message is composed of i.i.d. random variables. Although this assumption is valid in most cases (for URL names), instances exist where there is a dependency between the source message symbols. For example, if the source message uses English words, then this changes the distribution of the source symbols and they no longer follow an i.i.d. uniform distribution. Hence, one must also investigate the amount of information leakage when the symbols are dependent. Now, the probability of choosing a symbol is conditioned on the previously selected symbols in the same message, which decreases the source message's rate (i.e., the average entropy per symbol in the message).

The N-gram (sequence of any |N| adjacent symbols) entropy per symbol ($F_n$) is bounded as $$\sum_{i=1}^{N} i\log i(p_i^a - p_{i+1}^a) \leq F_n \leq \sum_{i=1}^{N} p_i^a \log p_{i+1}^a, \tag{28}$$

in a way that given the previous a−1 symbols, there is a partial ordering of the symbols in the source alphabet corresponding to their probability of appearing as the next symbol. This can be discerned as a mapping between the symbols and integers such that the most probable next symbol (the $a^{th}$ symbol) conditioned on the a−1 previous symbols, maps to i=1, the second probable symbol maps to i=2, and so on. Hence, pa represents the probability of the $i^{th}$ most probable symbol (among N symbols) to be placed at the $a^{th}$ position in the message, conditioned on the known a−1 previous symbols. Clearly, $p_i^1$ is the most probable next symbol for the $a^{th}$ position in the message and $p_i^N$ is the least probable symbol for the same position in the message. Therefore, $$p_N^a \leq p_i^a \leq p_1^a, \tag{29}$$

which can be inferred from (28). The overall probability of source symbols for the $(a+1)^{th}$ position in the source message is at least equal to the overall probability of source symbols for the $a^{th}$ position, that is, $$\sum_{i=1}^{N} p_i^a \leq \sum_{i=1}^{N} p_i^{a+1}. \tag{30}$$

In other words, the probability of guessing the correct source symbols increases with the size of the source message. For instance, for the word "the", the probability of guessing "e" after guessing "t" and "h" is higher than the probability of guessing "h" after guessing "t."

The general lower bound of the entropy of a source message with k symbols is given as:

$$\Gamma = \sum_{j=1}^{k} \sum_{i=1}^{N} i \log i (p_i^j - p_{i+1}^j). \quad (31)$$

However, calculating $\Gamma$ is not easy because of the dependence of a symbol on previous symbols. Consequently, for ease of calculation one tries to obtain a bound that approaches $\Gamma$ from below. To obtain this bound, first derive the following equation:

$$k \sum_{i=1}^{N} i \log i (p_i^k - p_{i+1}^k) \le \Gamma \le k \sum_{i=1}^{N} i \log i (p_i^1 \log p_{i+1}^1). \quad (32)$$

Equation (32) is obtained from the fact that $\Gamma$ cannot be smaller than the entropy calculated for the source message by substituting the entropy of the last symbol (the last symbol's entropy, given the knowledge of the previous symbols is very low) in place of every source symbol; $\Gamma$ also cannot be larger than the entropy calculated by substituting all symbols with the first symbol in the source.

It is easy to see that in Scenario 1, the lower bound entropy of the source message is at least as high as the l.h.s. of (32). This is especially true as URL addresses tend to also have symbols other than the English alphabet and sometimes contain incomplete words or meaningless strings, which would increase their randomness. Hence, use the l.h.s. of Equation (32) to approximate the entropy of the source message, hence Equation (19) now becomes, $$I(M^k; Z) \le k \sum_{i=1}^{N} i \log i (p_i^k - p_{i+1}^k) - (2N - 3/2 \log N + N \log N) \quad (33)$$

$$\le \left( k N^2 \log N \sum_{i=1}^{N} (p_i^k - p_{i+1}^k) \right) - (2N + (N - 3/2) \log N). \quad (34)$$

Equating the r.h.s. of inequality (34) to zero, Equation (35) presents the condition for perfect secrecy, $$k \le \frac{2N + (N - 3/2) \log N}{N^2 \log N \sum_{i=1}^{N} (p_i^k - p_{i+1}^k)}. \quad (35)$$

Similarly, the perfect secrecy threshold for Scenario 2 is:

$$k \le \frac{N \log N}{N^2 \log N \sum_{i=1}^{N} (p_i^k - p_{i+1}^k)} \quad (36)$$

and Scenario 3 is $$k \le \frac{2N - 3/2 \log N}{N^2 \log N \sum_{i=1}^{N} (p_i^k - p_{i+1}^k)}. \quad (37)$$

Note that in the dependent source case, the bound for k is dependent on the inter-symbols dependency, which is intrinsic to each message. Hence, it is difficult to derive something similar to Table 2. However, in both set-ups (independent/dependent sources) an important follow-up question is, what happens when k is greater than the corresponding bounds? Then the secrecy is no longer information-theoretically perfect. Two choices exist at that point.

When k equals the bound the user and the anonymizer can use another Huffman table to continue perfectly secure communication. They can use a synchronized protocol where before k reaches the bound the anonymizer can piggyback a new encrypted Huffman table (a small overhead) with the data. Or, in the interest of speed and low overhead, the user can choose to keep using the current table and risk leaking information. In this latter case, an eavesdropper can utilize the information leakage to mount efficient brute-force or cryptanalysis attacks to break the framework. In the next section, this application analyzes the feasibility of such attacks.

In this section, the application investigates and analyzes the security of the framework of the present invention from the perspective of well-known attacks. The present invention is secure against known plaintext attacks. Also, it is secure against the chosen plaintext attack as the eavesdropper cannot get the user/anonymizer to encrypt a chosen plaintext using the corresponding Huffman table. In the chosen ciphertext attack, the attacker needs to obtain the decryption of its selected ciphertext. This is not possible in the present framework, as the anonymizer is the only entity with decoding capability. But, the anonymizer does not publish the decoded interest. The use of independent Huffman tables for users, selected uniformly at random, prevents the information leakage of one user from affecting others. This uniform selection of coding tables also prevents users to be able to correlate their coding tables with those of others to decode their encoded interests. Ciphertext-only attack can be mounted as the attacker has access to a set of ciphertexts (encoded interests). If the user continues to use the same Huffman table, then the repeated interests will have the same encoded names, leaking information that the eavesdropper can use to make the cipher-text attack more potent. This leakage can be prevented by XOR-ing the postfix with a nonce and sending the nonce appended with the encoded URL.

This leaves two attacks that can be orchestrated by an attacker (active/passive): Correctly guessing the source message from the encoded sequence, i.e., ciphertext-only attack, or using brute-force to identify the correct key and the tree structure. As to correctly guessing the source message, the present analysis uses guessing entropy, which is the expected number of guesses required by an attacker to ascertain the correct source message, to calculate the ease of guessing the source message. Let $G(M^k|\underline{Z})$ be the number of guesses required to identify $M^k$ given $\underline{Z}$, in a way that $E[G(M^k|\underline{Z})]$, the expected number of successive attempts, is minimized. Equation (38) evaluates the corresponding $E[G(M^k|\underline{Z})]$:

$$E[G(M^k | \underline{Z})] = \sum_{z \in Z} P_{\underline{Z}}(z) E[G(M^k | z)], \quad (38)$$

where $P_{\underline{Z}}(z)$ is the probability of selecting an encoded binary sequence from the pool of all possible binary sequences. The guessing entropy is lower bounded by the conditional entropy as $$E[G(M^k|\underline{Z})] \ge 2^{H(M^k|\underline{Z})-2}+1. \quad (39)$$

Now one evaluates the lower bound on the guessing entropy in the three scenarios. Substituting Equation (19) in Equation (39), one has the lower bound guessing entropy for Scenario 1 as:

$$E[G(M^k|\underline{Z})] \geq 2^{(2N+(N-3/2)\log(N)-2)}+1. \tag{40}$$

Similarly, by substituting Equations (23) and (27) in Equation (39), one has:

$$E[G(M^k|\underline{Z})] \geq 2^{(N\log N)-2}+1 \tag{41}$$

and $$E[G(M^k|\underline{Z})] \geq 2^{(2N-3/2\log(N)-2)}+1 \tag{42}$$

for Scenarios 2 and 3 respectively.

Figure 3:
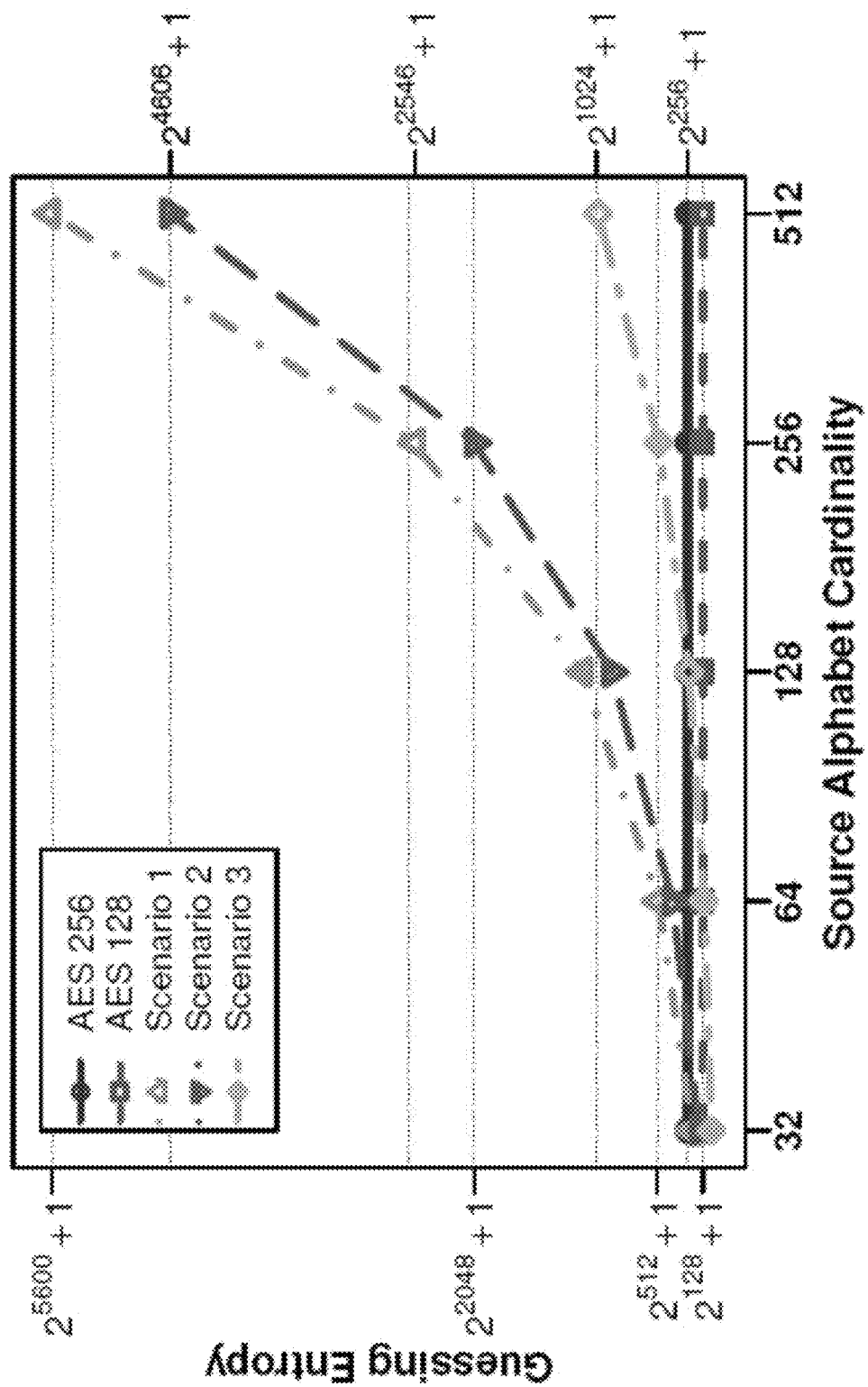
FIG. 3 is a graph of guessing entropy for three scenarios according to the invention.

FIG. 3 illustrates the lower bound of the guessing entropy under the three scenarios described above, with different source alphabet size. As the conditional entropy of an unknown structure is higher than that of an unknown key, it is obvious that the attacker can extract the source message with a fewer number of guesses in Scenario 3 compared to Scenario 2.

As mentioned above, there are N! alphabet orderings for a given tree. Considering an N symbols alphabet, there exists $C_N = (2N'!)/[(N'+1)! \times (N'!)]$ different Huffman trees where $N'=N-1$. Each of these Huffman trees has N! alphabet placement. For a brute-force attack to identify the mutation tree, an attacker needs to compute on average N!/2 different alphabet placement. Given this, the attacker has to use $[(2N-2)!/N! \times (N-1)!]$ $N!/2 = [(2N-2)!/2 \times (N-1)!]$ different Huffman coding tables on average to decode the encoded message when attempting the brute force attack. Even with N=256 (extended ASCII) it is computationally difficult to examine this search space at a filtering router, even when it is performed offline.

So far, the application has proved the information-theoretic secrecy and the computational security of the inventive framework. In the next section, the application presents experimental results, which answer the next question: how efficient, applicable, and scalable is the framework for real-world mobile devices?

In this section, the application augments the security of the proposed framework against chosen plaintext and chosen ciphertext attacks. As mentioned above, the attacker does not have access to the encoding and decoding oracles to mount chosen plaintext and chosen ciphertext attacks. However, the system is insecure if the attacker maliciously enforces the client/anonymizer to encode/decode a plaintext/ciphertext. Thus, an extension to the framework is presented to prevent such scenarios that is also secure against pattern analysis attack on the encoded message, which helps the attacker to infer some information about the message.

In the initialization phase, the client and the anonymizer, in addition to a random Huffman table and a pseudonym range, share a master key ($\mathbb{K}$). For securely requesting a content, the client first encodes the plaintext and randomly selects an in-range pseudonym as explained above. Following the Huffman encoding, the client generates a temporary key (K) by hashing $\mathbb{K}$ with the selected pseudonym (will be used in the interest packet) using a keyed hash function. Eventually, the client XORs the temporary key, K, with the encoded message. If the length of K is smaller than the length of the encoded message, the temporary key will be repeated to the length of the message.

The anonymizer, who is receiving the interest, looks up the client using the pseudonym to find the corresponding master key ($\mathbb{K}$) and coding table. Using the same hash function, the anonymizer generates K by hashing the pseudonym in the interest with the master key and XORs the result with the received interest. Eventually, the anonymizer decodes the message using the corresponding Huffman table (as defined above).

In order to evaluate the secrecy threshold in this new model, one first derives the entropy of the generated temporary key, K. Since K is generated by a hash function, assume that each symbols of the hashed value is an i.i.d. random variable, and hence the entropy of K is:

$$H(\mathcal{K}) = -\sum_{h=1}^{2^{|\mathcal{K}|}} p(h)\log(p(h)) \tag{43}$$

$$= -\frac{1}{2^{|\mathcal{K}|}} \sum_{h=1}^{2^{|\mathcal{K}|}} \log(p(h)) \tag{44}$$

$$= \log(2^{|\mathcal{K}|}) \tag{45}$$

$$= |\mathcal{K}|, \tag{46}$$

where |K| is the length of the temporary key (hashed value) in bits. The perfect secrecy threshold for the Equation (19), will be transformed as:

$$I(M^k; \underline{Z}) = H(M^k) - H(M^k|\underline{Z}) \tag{47}$$

$$\leq \max(kH(X) - (H(T_R) + H(A) + H(K))(0)) \tag{48}$$

$$k\log(N) - 2N + (3/2 - N)\log(N) - |\mathcal{K}|. \tag{49}$$

Consequently, Equation (23) will be:

$$I(M^k; \underline{Z}) \leq \max(kH(X) - (H(A) + H(\mathcal{K})), 0) \tag{50}$$

$$= \max(k\log N - (N\log(N) + |\mathcal{K}|), 0) \tag{51}$$

$$= k\log N - N\log(N) - |\mathcal{K}|, \tag{52}$$

and Equation 27 will be:

$$I(M^k; \underline{Z}) \leq \max(kH(X) - (H(T_R) + H(\mathcal{K})), 0) \tag{53}$$

$$= \max(k\log N - (2N - 3/2\log N + |\mathcal{K}|), 0) \tag{54}$$

$$= (k+3/2)\log N - 2N - |\mathcal{K}|. \tag{55}$$

Even in the scenario in which the attacker knows both the tree structure and the alphabet ordering, decoding the ciphertext is not trivial due to the XOR operation as:

$$I(M^k; \underline{Z}) \leq \max(kH(X) - H(\mathcal{K}), 0) \tag{56}$$

$$= \max(k\log N - |\mathcal{K}|, 0) \tag{57}$$

$$= k\log N - |\mathcal{K}|. \tag{58}$$

Here, one does not draw a table similar to Table 2 as different hashing functions have different output length, which makes the length of the temporary key dependent on the employed hashing function. Furthermore, converting the length of the temporary key (in bit) to the number of source symbols would not be precise due to variable length nature of Huffman codes. Although for a rough estimation, one can divide the number of bits in K to the expected length of Huffman codes, |K|/E[I(X)].

For the experimental evaluation, one has clients requesting content over the network to a CCN media server (content provider), which is also the anonymizer. The testbed consists of 18 nodes, eight desktops, six laptops, and four smartphones (3 Nexus 4 and one Nexus 5). A 4-tiered line topology network is connected using switches and IPv4 routers. For the experiments, the clients and the anonymizer are placed on either ends of the line—requests travel over five hops. The client, server, and the nodes in the network employ the CCNx-0.7 code base; the present framework is implemented in C and is integrated into CCNx. The nodes route packets using longest prefix matching.

For fair comparison, the tests have disabled caching, so an interest passes through all 4 tiers. The tests compare latency and content retrieval time over four different scenarios, namely the vanilla (Baseline) CCN implementation, CCN with our anti-censorship framework (CCN+Huffman), data retrieval using FTP, and using Tor, the state of the art Internet anti-censorship tool. The tests also compare the overhead of the inventive framework and Tor over their respective baselines, Baseline CCN and FTP, respectively. For testing Tor, the tests setup the testbed as a Tor network where the first three network gateways (from client towards the server) are provisioned as Tor proxies—three onion layers of symmetric encryption for the client. All the results were averaged over 100 runs. The size of the contents in the experiments were chosen from the set {1 MB, 10 MB, 100 MB, 500 MB}.

One option for encoding the data name (or the postfix after the domain name) is to use a strong symmetric key algorithm, such as AES. In Table 3, the tests compare the time taken for encryption/decryption by two widely used AES versions and for encoding/decoding using the inventive framework. As an alternative solution, the client can hash the content name with a salt given by the anonymizer. The anonymizer needs to pre-hash all the content names with each salt corresponding to each client. Upon receiving an interest from a particular client, the anonymizer does a look-up on the hashed content name to find the requested content. Though the storage requirement for these hashes grows infeasible with a large number of clients and/or contents, the tests nonetheless evaluate the performance of the Openssl SHA1 digest for the sake of comparison.

TABLE 3

Running time comparison between the AES
symmetric key cryptography and Huffman encoding.

| Encoding Scheme | Encoding (s) | Decoding (s) |
|---|---|---|
| aescrypt in unix (laptop) | 0.050 | 0.021 |
| AES openssl (laptop) | 0.010 | 0.008 |
| Huffman coding (laptop) | 0.004 | 0.004 |
| AES openssl (Nexus 5) | 0.041 | 0.023 |
| Huffman coding (Nexus 5) | 0.006 | 0.005 |
| Huffman* (laptop) | 0.000034 | 0.000027 |
| SHA1 hashing (laptop) | 0.000093 | |

The tests measured the timings on a wired laptop (AMD Turion, 2.4 GHz, dual core, 2.7 GB RAM) and on two wireless Nexus 5 smartphones (Krait 2.3 GHz, quad core, 2 GB RAM). For the Huffman operations, indicated by "Huffman coding" in Table 3, the time includes reading the source symbol frequencies, building the tree, and encoding/decoding the codewords. While the "Huffman" represents the elapsed time only for the encoding/decoding operations. The represented time for AES accounts for the encryption and the decryption operations only. The data name in the test contained 75 characters.

The optimized OpenSSL AES version is almost four times as fast as the aescrypt version; note that this is the version used in the Tor experiments. Encoding/decoding in the inventive framework (Huffman) is three orders of magnitude faster than OpenSSL (0.000034 vs. 0.010). As mentioned in Protocol 2, a client has to hash the selected pseudonym with the master key and XORs the result with the encoded name. XOR is a low cost operation with negligible latency, which can be omitted. Hence, the combined cost of hashing (0.000093) and encoding (0.000034) operations on a laptop, as per Table 3 is ≈0.0001 second, which is two orders of magnitude faster than OpenSSL.

Figure 4:
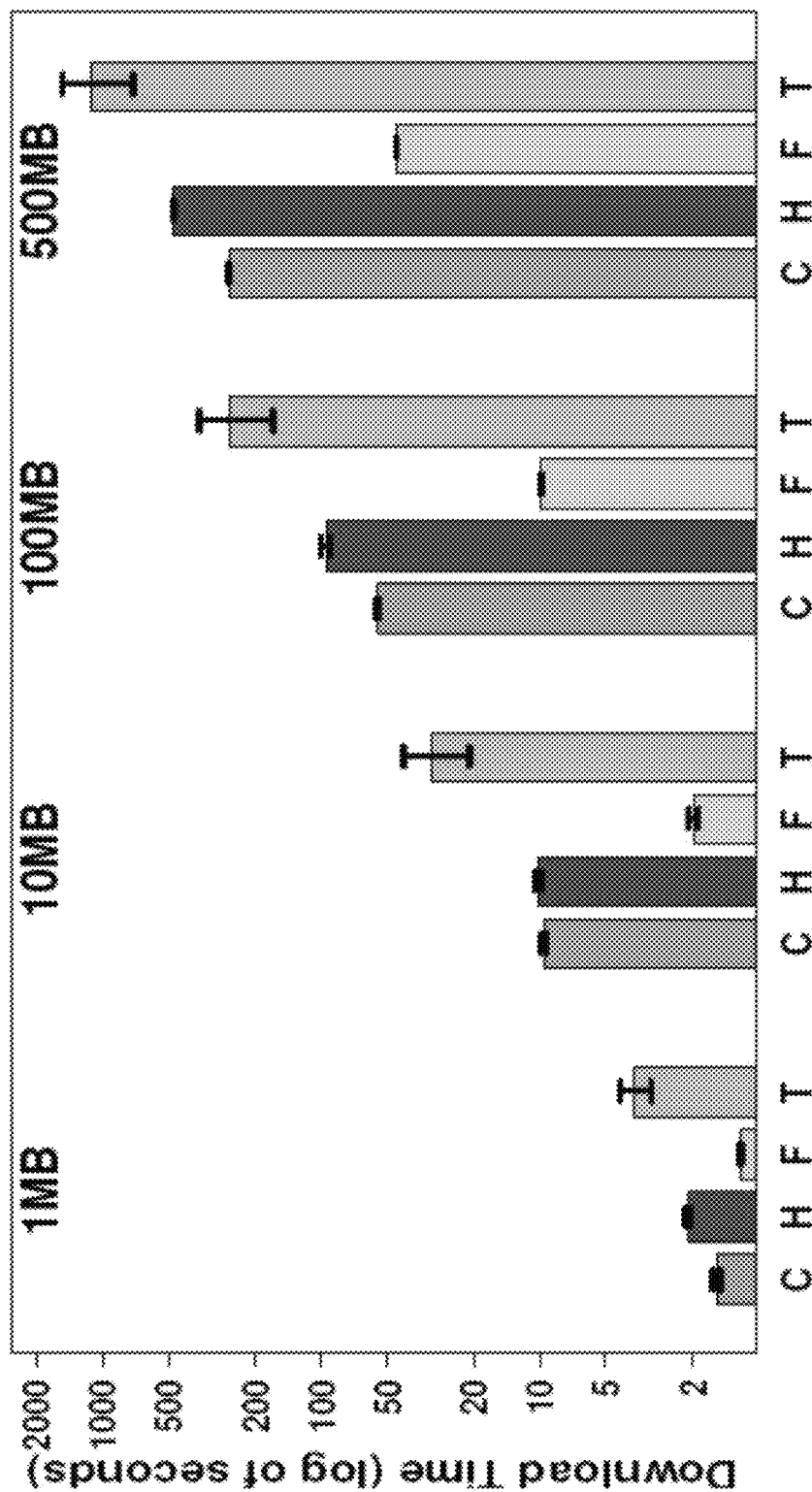
FIG. 4 is a graph of average download time comparisons between Baseline CCN (C), Huffman (H), FTP (F), and Tor (T)

FIG. 4 shows the download times on the laptop client for different content sizes and compares Baseline CCN (denoted as C), CCN+Huffman (denoted as H), FTP (denoted as F), and Tor (denoted as T); the Y-axis is in log scale for clarity. It is easy to understand that the download time increases for all approaches with increase in content size. CCN performs worse than FTP on account of the overheads of multiple searches on each forwarding node: searching the cache (content store) and searching the pending interests table (PIT) for the interest. This is true even if the data item is not in the cache. Having said that, the inventive framework on top of CCN does not add any appreciable extra delay (less than 1.8 times). In comparison, Tor results in significant additional overhead in comparison to FTP (between 2 and 38 times). Of course, the overhead for Tor is on account of the multi-layer encryption.

Figure 5:
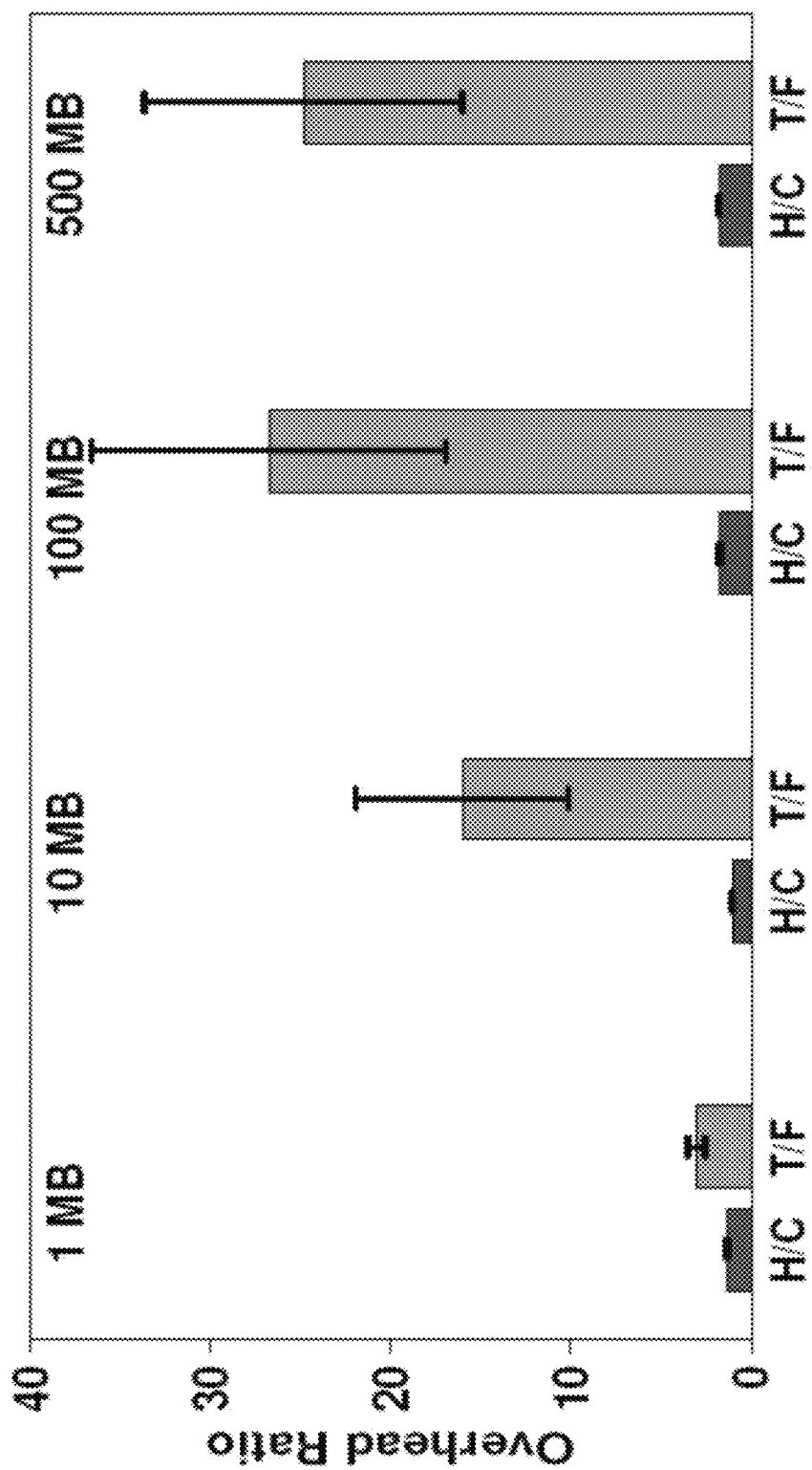
FIG. 5 is a graph of protocol overhead comparisons between Huffman (H/C) and Tor (T/F)

FIG. 5 presents the results of a detailed comparison of the overhead ratio of the inventive framework over the Baseline CCN with that of Tor over FTP. An interesting observation is that the error-bars for the overhead for Tor are much higher compared to those of the inventive framework. Given that the tests were the only applications running in the testbed, it shows that the multiple levels of encryptions in Tor result in erratic behavior (Tor does not induce inter-packet delays for anonymity), which is undesirable in terms of user experience.

Figure 6:
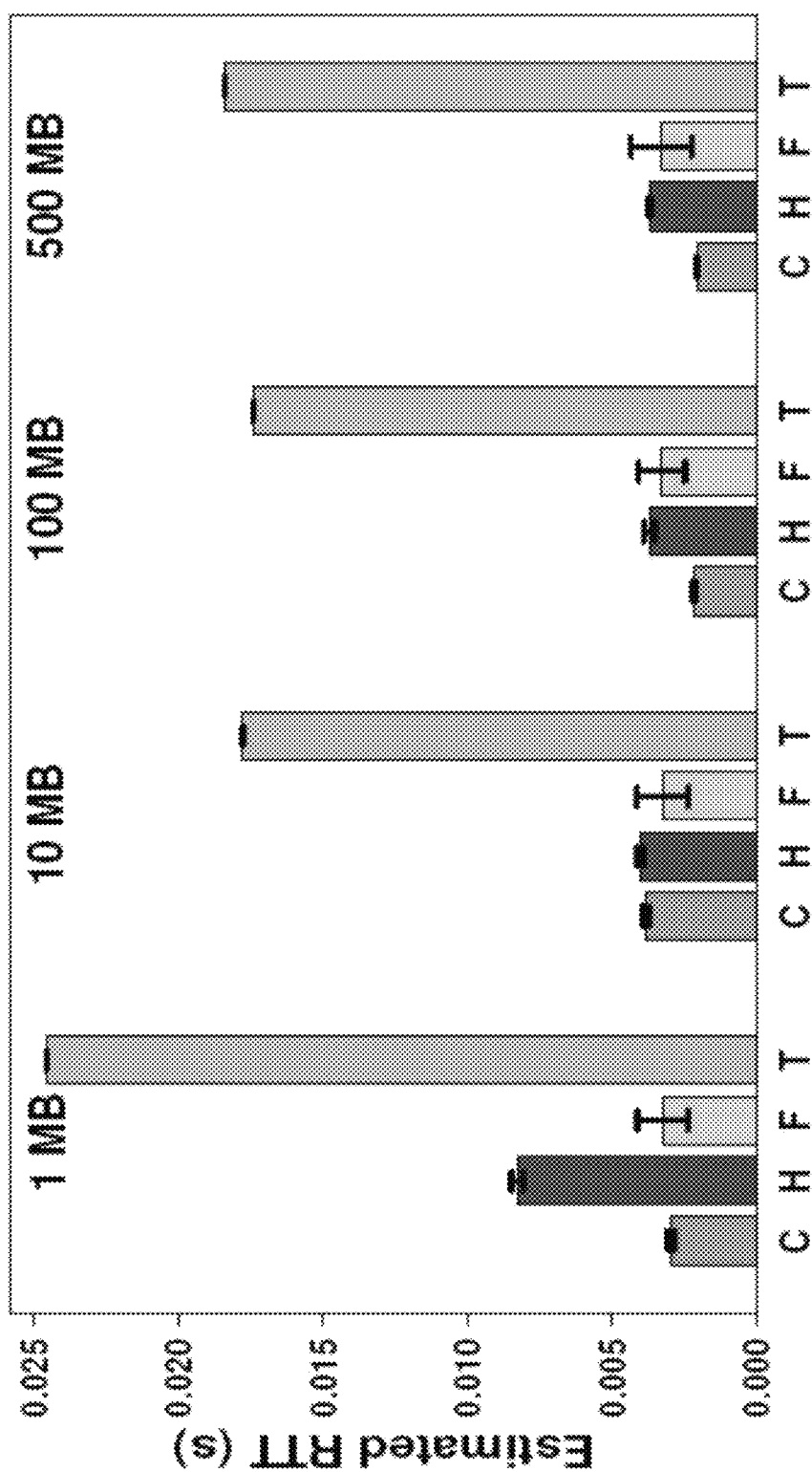
FIG. 6 is a graph of estimated average round trip time for C, H, F, and T.
Figure 7B:
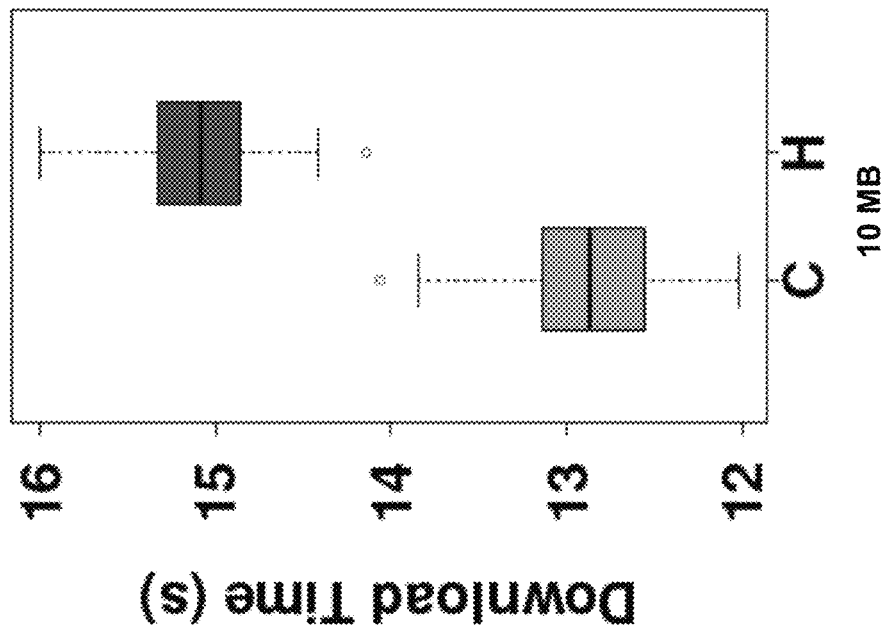
FIGS. 7A-D are graphs of download time comparisons between Baseline CCN (C) and Huffman (H) for smartphone clients.
Figure 7A:
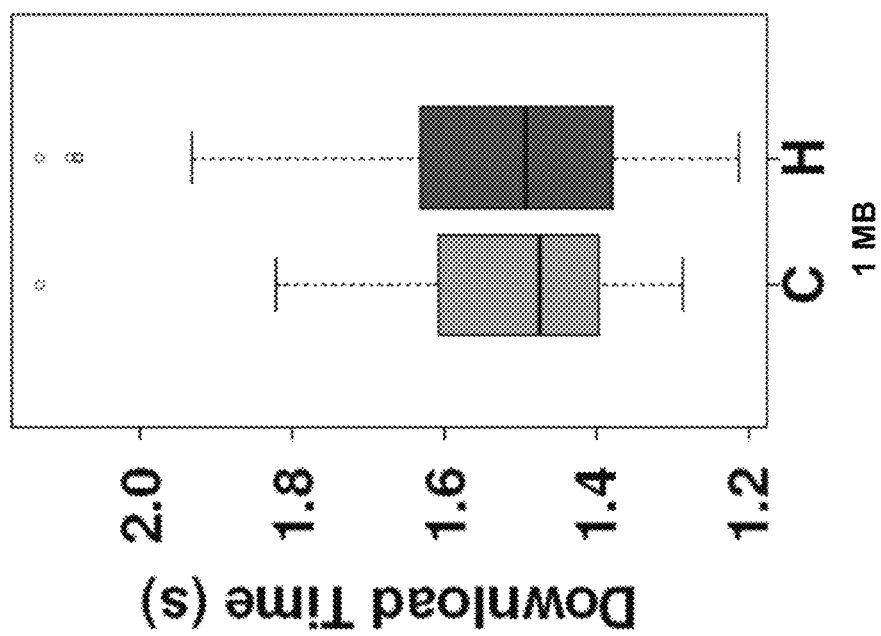
Figure 7D:
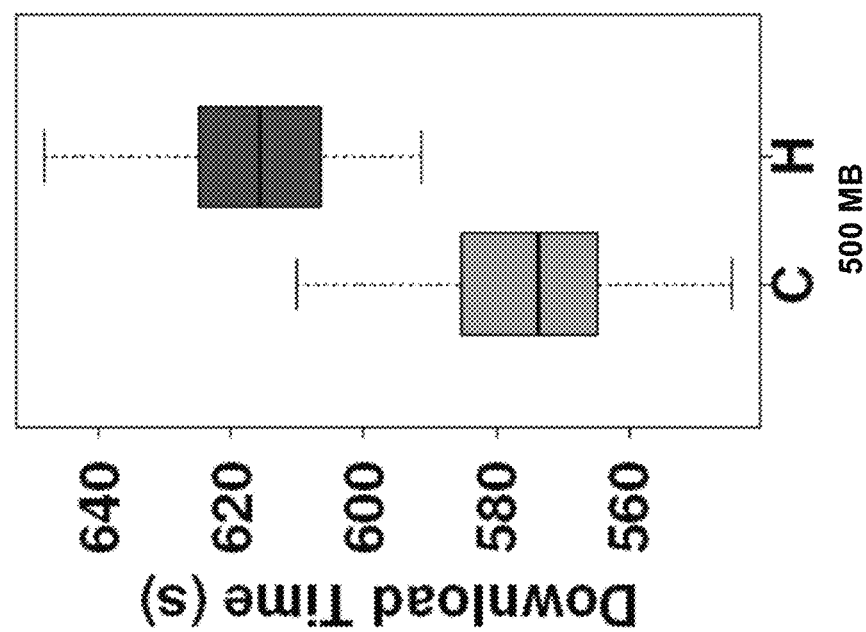
Figure 7C:
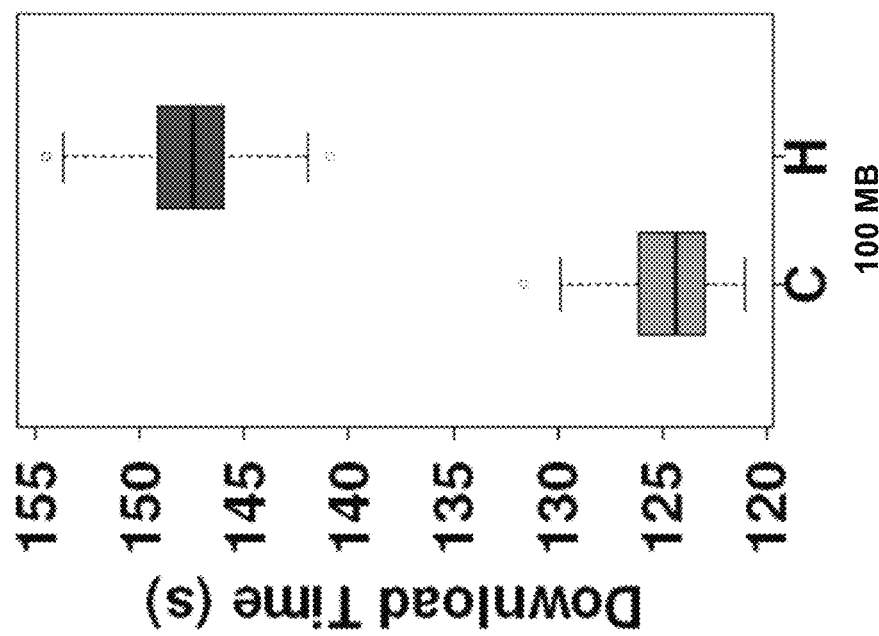

This fact is also highlighted by the estimated round trip time (RTT) results in FIG. 6. This application does not show the error-bars for the RTT because Tor's RTT varies a lot and undermines the graph's readability. Baseline CCN and the inventive approach have almost the same RTT, with very small deviations, but Tor has significant deviations. Note that the longer RTT values for the CCN and the inventive approach in comparison to FTP are due to the extra lookups.

Figure 8:
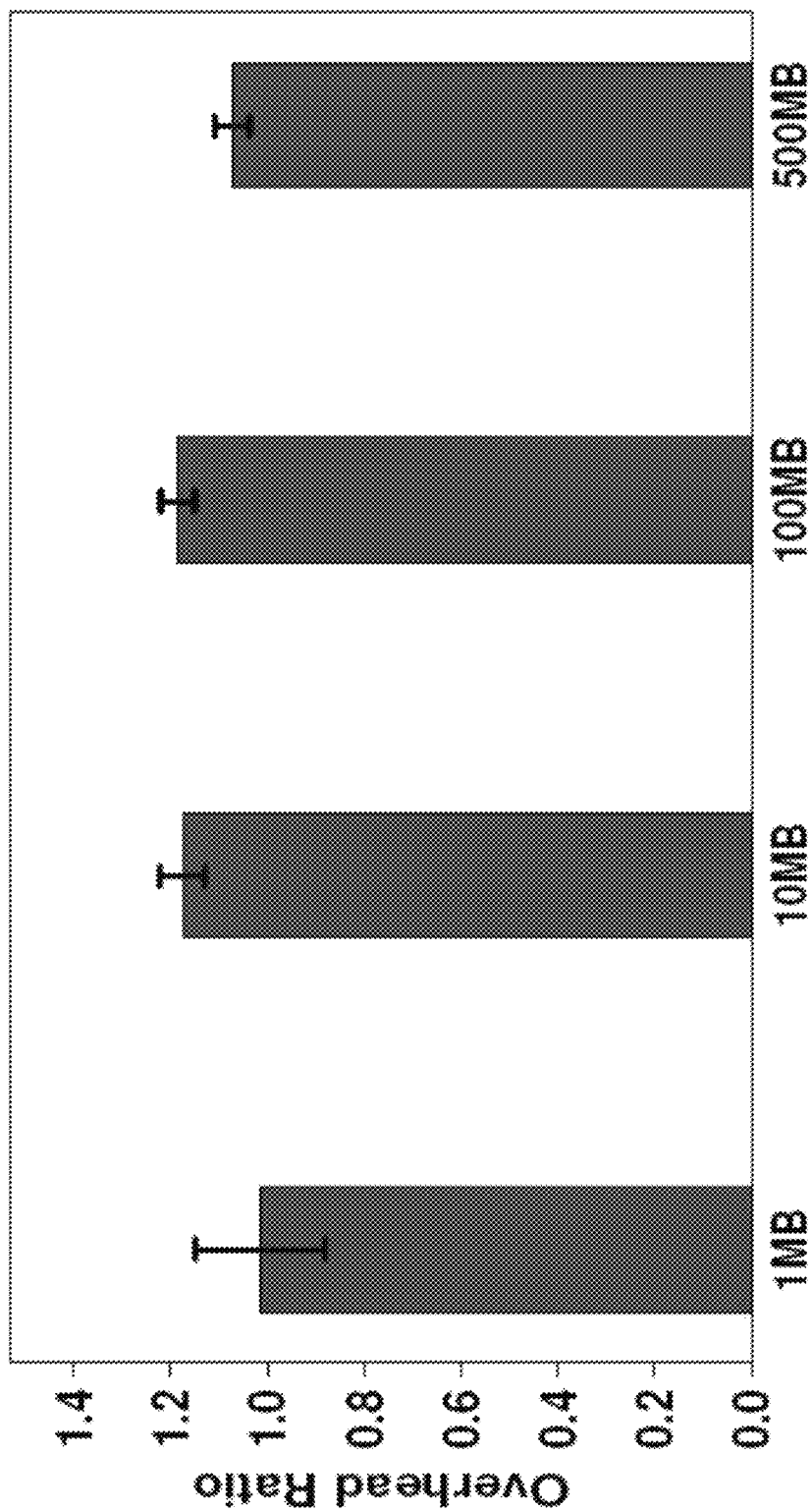
FIG. 8 is a graph of protocol overhead of Huffman for smartphone clients.
Figure 9:
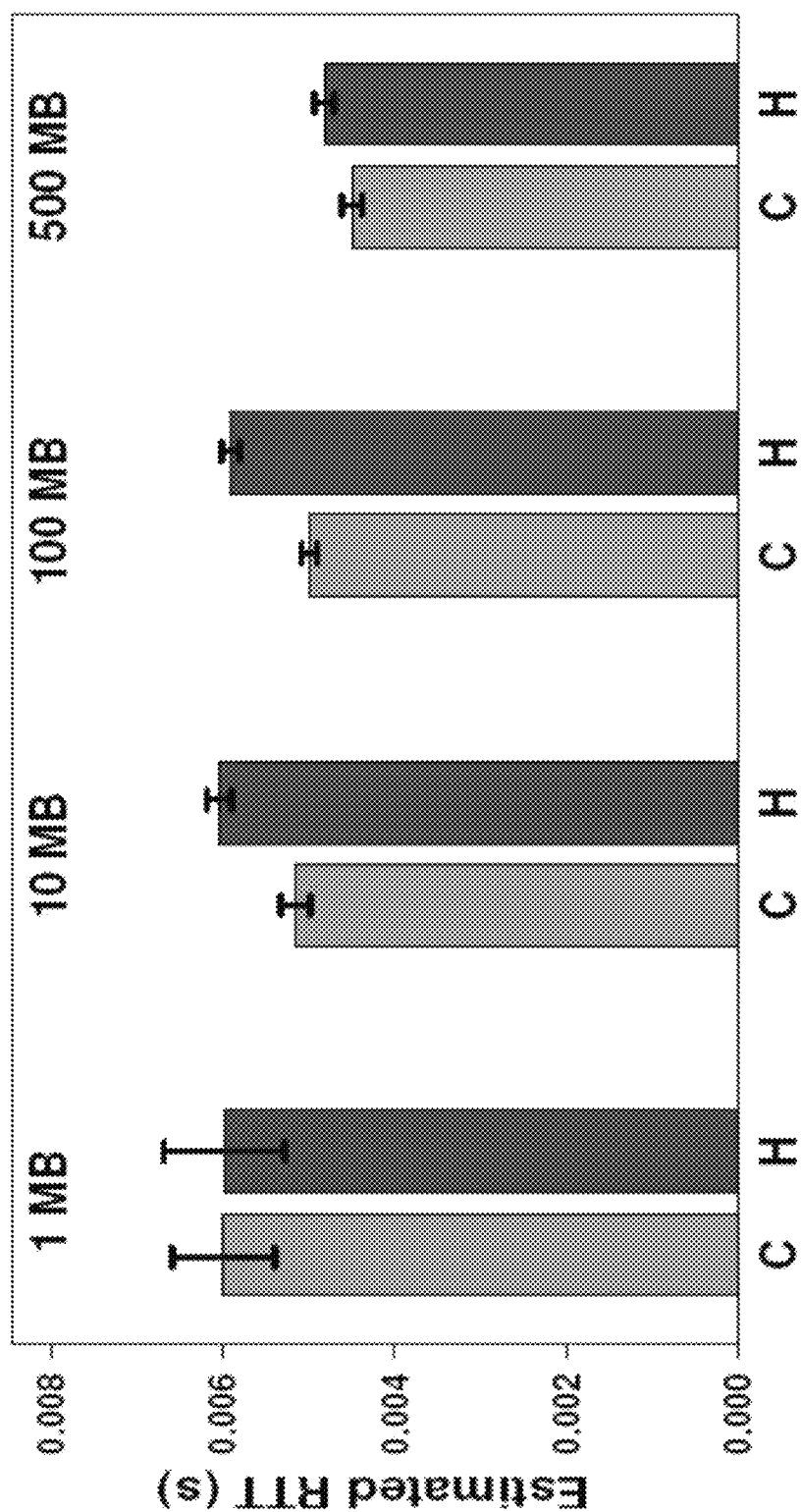
FIG. 9 is a graph of estimated average round trip time for C and H on smartphone clients.

FIGS. 7, 8, and 9 present averaged results for the smartphone clients (Nexus 5) connected over WiFi. For conciseness, this application only presents the CCN and the CCN+Huffman results. FIG. 7 presents the download times for the smartphones. Due to the wireless connections, which suffer from interference from other communications in the building, the smartphone clients require proportionally larger download times for all contents than the wired laptops.

FIG. 8 presents the overhead of the Huffman framework over Baseline CCN. Again, the overheads are minimal and with very low variance, which is excellent. FIG. 9 presents the comparison of the estimated RTTs between the Baseline CCN and the inventive framework for the smartphone client. The RTT values are very consistent for all runs, with the inventive framework having a very small increase in RTT in comparison to the baseline. The smartphone client results conform with those of the laptop, the variance is a bit higher because of the wireless medium and interference. The average RTT stabilizes for large contents, hence the RTT values tend to become lower. It is believed that the smartphone Tor RTTs will also have commensurate trends as the laptop results.

These results show that the inventive framework is much more efficient and scalable than Tor, the state of the art, as a mechanism to mitigate censorship of user communications.

In this section, the invention extends the Huffman coding technique for secure communication. For secure communication, a client and the server (anonymizer) should authenticate each other and securely share a Huffman table as their secret. The client uses this table for encoding part of its request while the server uses it for content encoding. The client sends a membership request to the Server and requests an initiation for a secure communication.

The client attaches its public key (PKC) and certificate to the membership request it sends to the server (Protocol 4: Line 1). Upon receiving this request, the server generates a random Huffman table and stores it along with the client's public key. It then forwards the Huffman table encrypted with the client's public key and signed by itself along with its public key (PKS a.k.a PKA) and certificate to the client (Protocol 4: Line 2). The client verifies the server's certificate to ensure the server's authenticity. It decrypts the Huffman table with its public key and stores it if the server's certificate is valid and drops it otherwise (Protocol 4: Line 3).

At this time a secure session is established and hence, the client can request a content from the server. The client then requests a content from the server (Protocol 4: Line 4). The server, upon receiving the request, retrieves the client's Huffman table, encrypts the content with the table, signs it, and forwards it to the client (Protocol 4: Line 5). The client validates the server's signature and decrypts the content with the Huffman table if the signature is valid (Protocol 4: Line 6). The shared Huffman table needs to be updated every so often to guarantee the security of the system. For requesting a new table, the client performs the same steps as at the beginning to share a new Huffman table with the server.

| Protocol 4 Initialization Phase | |
|---|---|
| Input: | Client's public/private key and certificate, server's public/private key and certificate. |
| Output: | A shared Huffman table between the client and server. |
| 1: | Client generates and sends membership request to the server: Request = $\langle PK_C, CR_C \rangle$ |
| 2: | Server generates a random Huffman table, stores it, and securely forwards it to the client along with its public key and certificate: Secret = $\{[HT]_{PR_S}\}_{PK_C}$ $\langle$ Secret, $PK_S$, $CR_S \rangle$ |
| 3: | Client decrypts the Huffman table and verifies the server's certificate and signature: $\{[$ Secret $]_{PK_S}\}_{PR_C}$ |
| 4: | Client request a content from the server. |
| 5: | Server looks up the client, signs the content and encrypts it with the Huffman table: Enc-Data = $([$ Data $]_{PR_S})_{HT}$ |
| 6: | Client decrypts the content with the Huffman table and validates the signature: $([$ Enc-Data $]_{PK_S})_{HT}$ |

The present invention provides a lightweight anti-censorship framework for ICN users, specifically for mobile users. This application proved conditions and thresholds for perfect secrecy as well as analyzed the computational complexity of the framework. The framework's breakability study showed the advantages of Huffman coding over AES, and the extensive experimental results demonstrated the efficiency of the inventive framework in comparison to other frameworks, such as Tor.

The invention can be additionally strengthened via innovations in several facets of the construction of the Huffman encoding to improve the underlying strength of the protocols. The facets are: 1) Frequently changing Huffman tables to increase entropy (hence secrecy) of the system; 2) dynamic choice of tree structure/topology; 3) dynamically changing labels of the edges; 4) dynamically changing order of associating the labels for the edges; and 5) dynamic assignment of the p.m.f for the symbols.

In at least one embodiment, and as readily understood by one of ordinary skill in the art, an apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Embodiments of the present invention provide a technology-based solution that overcomes existing problems with the current state of the art in a technical way to satisfy an existing problem for sending, receiving, coding, and decoding of confidential communications. An embodiment of the present invention is necessarily rooted in computer technology in order to overcome a problem specifically arising in the realm of computer technology. Embodiments of the present invention achieve important benefits over the current state of the art, such as increased flexibility, faster computation times, smaller memory requirements, etc. Some of the unconventional steps of embodiments of the present invention include the use of Huffman coding, employed in a unique manner to guarantee confidentiality for secure communications.

Note that in the specification and claims, "about" or "approximately" means within twenty percent (20%) of the numerical amount cited. All computer software disclosed herein may be embodied on any computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of sending content, the method comprising the steps of:

receiving a membership request from a client at an anonymizer, the membership request being encrypted with a public key of the anonymizer;

generating at the anonymizer a table from a prefix-free source coding scheme with a full binary tree, a pseudonym range, and a master key;

sending to the client from the anonymizer the table, the pseudonym range, and the master key, all encrypted with a public key of the client;

receiving a content request with an encoded content name from the client at the anonymizer, the content request being encoded using the table, a pseudonym selected from the pseudonym range and hashed with the master key to generate a hashed value, and the master key;

decoding the content name of the content request using the pseudonym, the table, and the master key;

retrieving content corresponding to the content name; and sending to the client from the anonymizer the content and the encoded content name.

2. The method of claim 1, wherein the table is a Huffman table.

3. The method of claim 1, wherein the encoded content name includes a domain name of the anonymizer.

4. The method of claim 1, wherein the encoded content name includes the content name encoded with the table.

5. The method of claim 4, wherein the encoded content name includes the content name encoded with the table and XOR'd with the hashed value.

6. The method of claim 1, wherein the table is randomly generated.

7. A non-transitory, computer readable medium comprising code for sending content, the code comprising:

code receiving a membership request from a client at an anonymizer, the membership request being encrypted with a public key of the anonymizer;

code generating at the anonymizer a table from a prefix-free source coding scheme with a full binary tree, a pseudonym range, and a master key;

code sending to the client from the anonymizer the table, the pseudonym range, and the master key, all encrypted with a public key of the client;

code receiving a content request with an encoded content name from the client at the anonymizer, the content request being encoded using the table, a pseudonym selected from the pseudonym range and hashed with the master key to generate a hashed value, and the master key;

code decoding the content name of the content request using the pseudonym, the table, and the master key;

code retrieving content corresponding to the content name; and code sending to the client from the anonymizer the content and the encoded content name.

8. The medium of claim 7, wherein the table is a Huffman table.

9. The medium of claim 7, wherein the encoded content name includes a domain name of the anonymizer.

10. The medium of claim 7, wherein the encoded content name includes the content name encoded with the table.

11. The medium of claim 10, wherein the encoded content name includes the content name encoded with the table and XOR'd with the hashed value.

12. The medium of claim 7, wherein the table is randomly generated.

* * * * *